991,250. CLIPPING AND PRUNING SHEARS. JOHN P. SOUTH, Austin, Tex. Filed July 20, 1909. Serial No. 508,674.

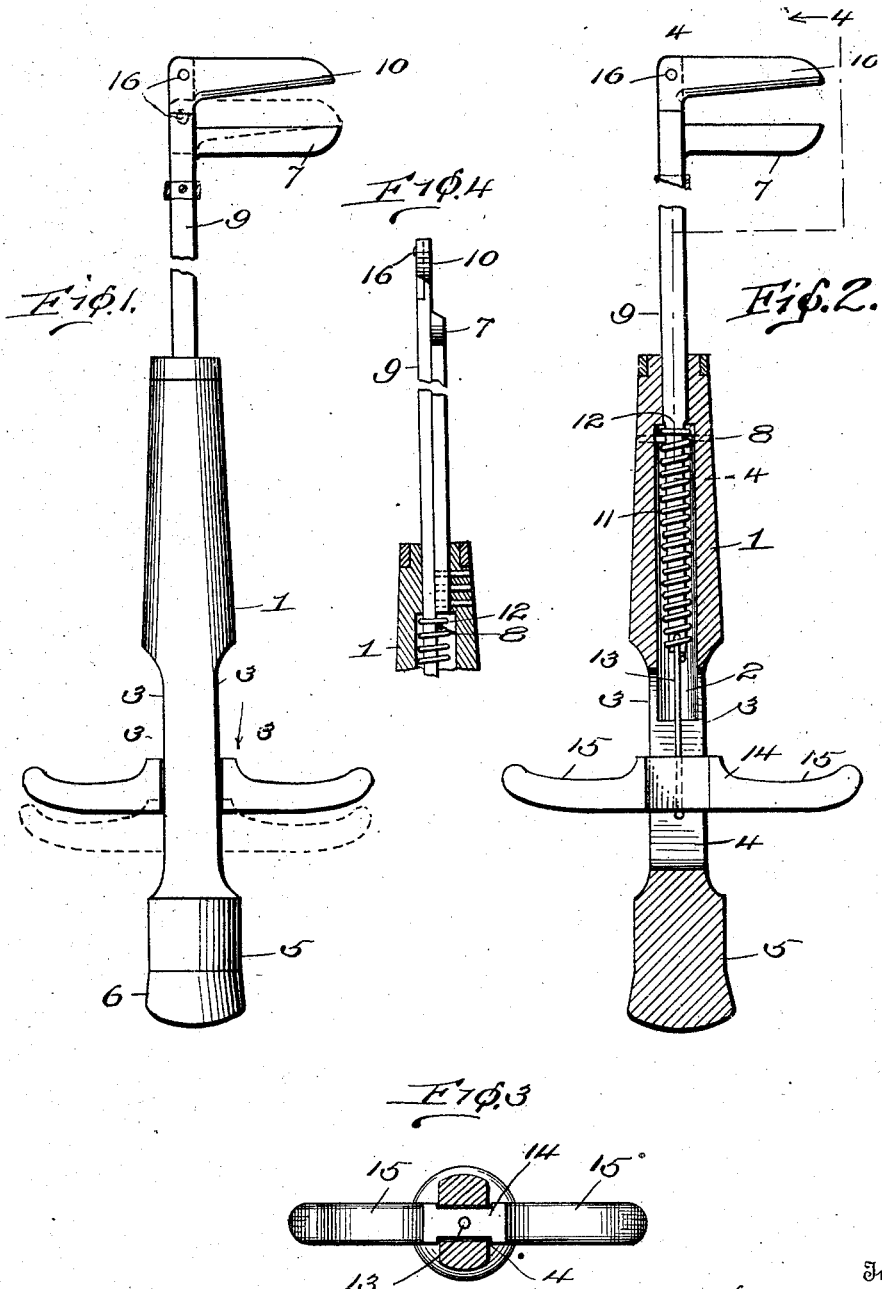

*To all whom it may concern:*

Be it known that I, JOHN P. SOUTH, a citizen of the United States, residing at Austin, in the county of Travis and State of Texas, have invented certain new and useful Improvements in Clipping and Pruning Shears, of which the following is a specification.

This invention relates to pruning shears and one of the principal objects of the same is to provide a simple hand tool for pruning and clipping plants, trees flowers, gathering fruits etc., which shall be easy to operate and which can be quickly operated for its purpose.

Another object of the invention is to provide a hand tool for pruning and clipping comprising blades which may be straight, hawk-bill-shape or curved for special purposes, said blades being removable and changeable for sharpening, said blades being mounted upon bars or shanks, one of which is movable relatively to the other for opening and closing the blades.

These and other objects may be attained by means of the construction illustrated in the accompanying drawing, in which—

Figure 1 is a side elevation of a pruning shears made in accordance with my invention and shown in operative position by dotted lines. Fig. 2 is a longitudinal section of the same. Fig. 3 is a transverse sectional view on line 3—3 of Fig. 1 looking in the direction indicated by the arrow. Fig. 4 is a detail sectional view taken on the line 4—4 of Fig. 2.

Referring to the drawing the numeral 1 designates the handle of the tool, said handle having a recess or bore 2 therein. The side portions of the handle are cut away as at 3 upon opposite sides thereof and a slot 4 extends through the handle at this point. A suitable knob 5 designed to rest upon the palm of the hand is formed on the end of the handle and if desired a separate ferrule or cap 6 may be applied to this portion of the handle.

Extending into the handle 1 is a shank having a rigid blade 7 formed thereon or secured thereto, said shank being secured to the handle by means of a suitable pin 8. A sliding shank 9 extends into the handle and is provided with a blade 10, which coacts with the blade 7 when operated to clip or cut stems or branches placed between the blades. The shank 9 is reduced at the point which projects into the recess 2 in the handle and said shank at this point may be made round if desired and surrounded by a spiral spring 11, the upper end of which bears against a washer 12 on the shank. Connected to the shank is a wire rod 13, said rod extending through a finger hold 14 mounted in the slot 4 in the handle. The finger hold is provided with oppositely extending curved arms 15.

The operation of my invention may be briefly described as follows: The tool is grasped in the right hand and two of the fingers are engaged with each of the curved arms 15, while the knob or cap 6 rests in the palm of the hand. By moving the finger hold down toward the cap 6, as shown in dotted lines in Fig. 1, the blade 10 is moved upon the blade 7 to clip any article placed between the two blades. The blades 7 and 10 may be readily removed, by removing the pins or screws 16, for sharpening, renewal or changing one form of blade for another.

From the foregoing it will be obvious that a pruning shears made in accordance with my invention, is simple in construction, is easy to operate, the blades being separated automatically by the spring so that it is necessary to move the blade in one direction only to operate the device.

The tool is composed of comparatively few parts cannot readily get out of order and is strong, durable and efficient.

Having thus fully described the invention what is claimed as new is:

The herein described pruning shears comprising a hollow handle, a flat shank mounted to slide within the handle, a flat blade detachably connected to the upper end of said shank and projecting from one side thereof, a spiral spring surrounding said shank within the handle, a flat shank rigidly connected to said handle and lying flat against the first named shank, a blade secured to said rigid shank and projecting laterally therefrom parallel to the first named blade, a rod connected to the sliding shank, and a finger-hold connected to said rod and mounted in a slot in said handle, said finger-hold projecting upon opposite sides of said handle, and a knob on the end of the handle designed to rest in the palm of the hand when the device is in position for operation.

In testimony whereof I affix my signature in presence of two witnesses.

JOHN P. SOUTH.

Witnesses:
C. H. BUCKLEY,
Mrs. EDWIN WALTER.